C. A. PATTISON & L. E. ROBY.
GRAIN DRILL.
APPLICATION FILED SEPT. 5, 1911.
1,054,235.
Patented Feb. 25, 1913.
2 SHEETS—SHEET 1.
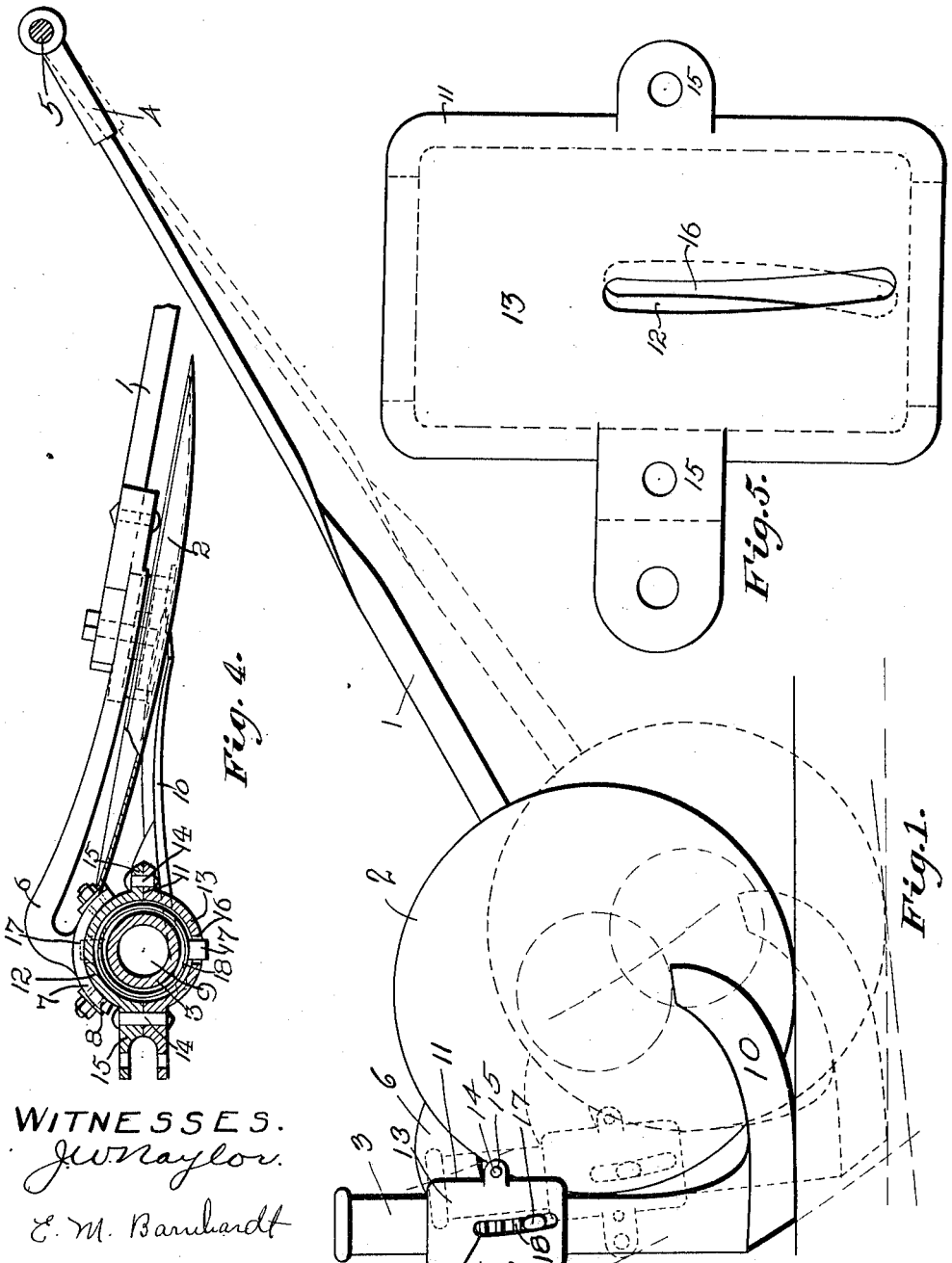

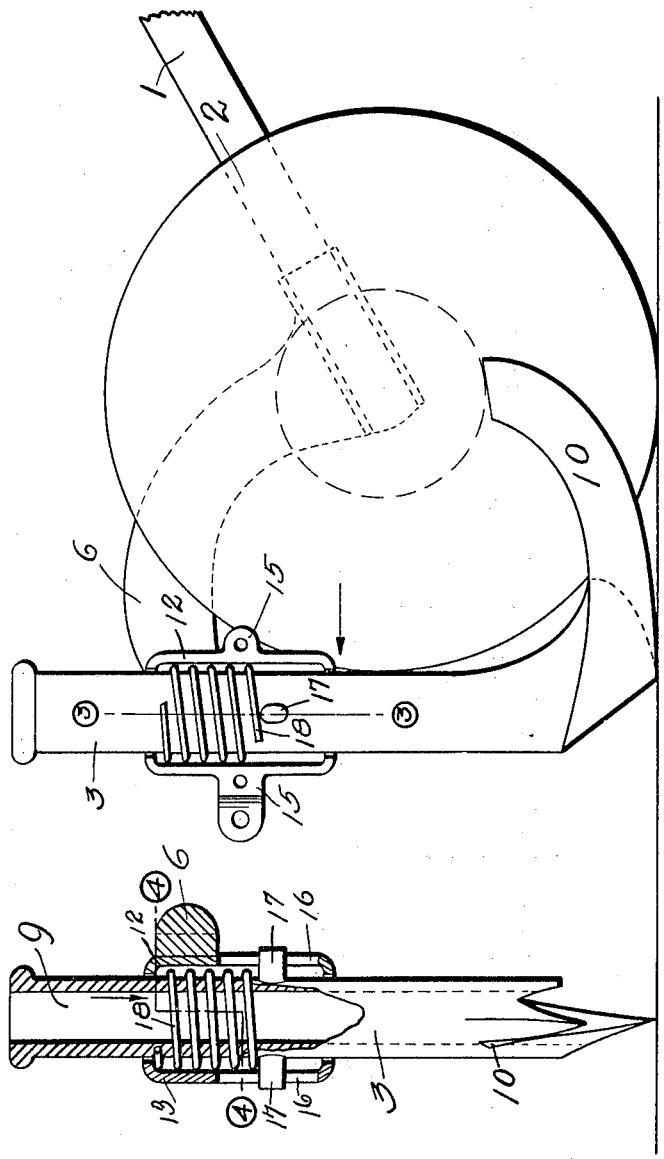

UNITED STATES PATENT OFFICE.

CLARENCE A. PATTISON AND LUTHER E. ROBY, OF PEORIA, ILLINOIS.

GRAIN-DRILL.

1,054,235. Specification of Letters Patent. Patented Feb. 25, 1913.

Application filed September 5, 1911. Serial No. 647,786.

*To all whom it may concern:*

Be it known that we, CLARENCE A. PATTISON and LUTHER E. ROBY, citizens of the United States, residing at Peoria, in the county of Peoria and State of Illinois, have invented certain new and useful Improvements in Grain-Drills, of which the following is a specification.

This invention has reference to grain drills, and relates particularly to the manner or means for supporting the seed tube or tubes in their relation to the disks.

The principal object of the invention is to support the seed tube in its relation to the disk so that it may have movement longitudinally of its axis, and if such tube has a shoe or runner, which is preferable, and said shoe or runner is unattached at its forward end, which is also preferable; that, as the disk is forced into the ground the tube will be caused to follow, while at the same time be capable of automatically adjusting itself vertically, so that its lower end or runner will follow in the furrow cut by the disk. Means being provided to yieldingly hold the tube in working relation with the disk.

While we have, in the accompanying drawings, shown our invention as embodied in the form which we prefer to adopt, and which we have found to answer to a satisfactory degree the ends to be attained, it will be understood that the invention is not to be limited to any particular details of construction, except in so far as such limitations are specified in the claims.

Figure 1 is a side elevation of a disk opener and associated seed tube, together with the draw-bar, the same being constructed in accordance with our invention, the dotted lines illustrating the vertical movement of which the seed tube is capable when the disk is forced into the ground; Fig. 2 is a large view of the disk and tube, parts being in section; Fig. 3 is a vertical sectional view, as the same would appear if taken on the line 3—3 of Fig. 2; Fig. 4 is a horizontal sectional view, as the same would appear if taken on the line 4—4 of Fig. 3, and Fig. 5 is an enlarged side elevation of a part with which the seed-tube is associated, such view illustrating certain important details in construction.

Like numerals denote corresponding parts throughout the drawings.

1 designates a draw-bar or supporting arm for the disk 2 and the seed tube 3. The draw-bar 1 is preferably attached to a head member 4 having a pivotal or swinging relation with a rod or bar 5 carried by the main frame of the machine.

The disks are usually mounted in gangs in the seeding machine, the draw-bars being connected in the manner shown, with the machine frame, so as to supply the necessary draft, and the disks being so mounted that they will extend at an angle with reference to the line of travel.

The disk 2 is carried by the draw-bar 1 and journaled to rotate thereon, in any suitable or preferred manner, preferably so that it is disposed at an angle with reference to the line of travel, see Fig. 4. The disk as shown, is concavo-convex with the concave side adjacent the bar to which it is connected.

Attached to or supported by the draw-bar 1 or the bearing for the disk, whichever may be preferable, is an arm or member 6, which said arm is also preferably supported adjacent the concave side of disk 2, and said arm extends to the rear of the disk and is provided with ears 7 having slots 8, the function of said arm and ears to be further explained.

The seed tube 3, in most respects, is similar to tubes in use in seeding machines of the type herein referred to, having the conduit or seed passage 9 therethrough, to receive the seed or grain at its upper end and discharge the same at its lower end into the furrow for receiving same. The tube 3 in this instance has a shoe or runner 10, preferably carried adjacent to or in close proximity to the convex face of the disk 2. The said shoe or runner 10 extending forwardly and upwardly, being preferably unattached at its outer or upper end, and also preferably conforming to the convex face of the disk.

To support the seed tube 3 in working relation with the disk 2, we provide, preferably, a tubular support 11, composed of two semi-circular sections 12 and 13 which may be secured together by bolts 14 passing through matching ears 15 on the sections 12 and 13. The upper and lower ends of the tubular support 11, are provided with axially alined openings through which the seed tube 3 passes and has a bearing. The tubular support is sustained in working position by attaching same to the ears 7 of the arm or member 6, bolting said section 12 of the support 11 to said ears 7. The ears 7 having the slots 8 to allow for adjusting the support 11 with the tube 3, in a rotatable manner thereon, for purposes which will be further explained.

The sections 12 and 13 of the support 11 are each provided with the corresponding vertically disposed and approximately arc-shaped slots 16 in which are carried and adapted to move therein, lugs or pins 17 projecting from the seed tube 3, see Fig. 3, and around said seed tube 3 within the support 11 and between the lugs or pins 17 and the upper inner wall of the support 11, is arranged a coil spring 18, see Figs. 2 and 3, the function of which is to yieldingly hold the seed tube in working relation with the disk and in the furrow being formed, while at the same time allow the tube to move upwardly against such yielding pressure, for purposes to be further explained. Reference being had to Fig. 5, it will be observed that the slots 16 of the two sections 12 and 13 form, what may be termed portions of threads, each being curved, if curved at all, oppositely to each other, for purposes hereinafter more fully set forth.

To the support 11, and preferably to one set of ears 15, may be attached a spring lift rod 19 for depressing the disk 2 to a suitable depth in the ground which will carry with it the seed tube and shoe to follow in the furrow formed by the disk insuring the deposit of seed or grain in the deepest portion of the furrow cut by the disk; said rod 19 being also used for elevating the parts out of the ground.

The disk 2 and the tube 3 being connected with or attached to the draw bar 1 and the draw bar, in turn having a pivotal connection with the machine frame, it is obvious that all of such parts, whether raised or lowered oscillate on the common pivotal center 5 of the draw-bar. It will be further observed that when the parts, described, are depressed and the disk 2 caused to enter the soil to open the furrow, that the tube 3 with its runner 10, swinging on a much longer arc, (the axis of which is the pivotal point 5) than the disk 2, will have to accommodate itself to this variation, because it cannot enter the soil deeper than the base of the furrow cut by the disk; at least it is the intent and purpose of the present arrangement to keep the lower edge of the runner in the furrow to travel in the wake of the cutting edge of the disk. The disk entering the soil cuts the furrow making a loose seed bed and the shoe or runner traveling in the wake of the disk molds and packs or forms the furrow to receive the seed or grain dropped through the said tube, which is then subsequently covered in the usual manner. To accomplish this result, we permit or allow the tube 3 to automatically move longitudinally of its axis and through the support 11, against the yielding pressure of the spring 18, which acts to hold the tube in proper working relation in the furrow being formed.

To position the shoe or runner 10 in proper working relation with the convex face of the disk 2, the support 11 may be rotatably adjusted on the arm or member 6, through the provision of the slots 8 in the ears 7.

The slots 16 in the sections of the support 11 may be straight, that is, their side walls may assume a vertical position without any curve whatever, or such slots and their side walls may be arc-shaped, as shown in Fig. 5, and of any degree suitable to carry out the purposes and intent of the present invention; in other words the degree of the arc of the slots 16 is determined by the degree or character of the convex face of the disk. The greater the convexity of the disk the greater the degree of the arc of the slots, and the flatter the convex face of the disk the more approximately straight must be the slots 16 or the walls thereof. The reason for which is that, the runner 10 of the tube 3 should be kept in proper working relation with the face of the disk, so that in the raising or lowering of tube and runner, this position may always be maintained. Should the runner become worn because of its coming into contact with the disk, adjustment may be made, in the manner specified by, adjusting the support 11 on the arm or member 6, causing the runner to be moved from or toward the disk.

It is now obvious that by reason of the slots 16 forming portions of threads, if a disk has a pronounced convex face, when the tube 3 moves upwardly as the disk is depressed the pins 17, following the slots 16, will oscillate the tube as it rises and swing the end of the shoe or runner laterally for purposes of maintaining the working relation between the shoe or runner and disk, thereby preventing binding, which would otherwise occur, due to the disk being convex.

What we claim is:—

1. In combination, a seed tube and a support therefor, said tube capable of longitudinal movement relative to its support, and coöperating means on tube and support for guiding the tube.

2. In combination, a seed tube and support therefor, said tube capable of longitudinal movement relative to its support, coöperating means on tube and support for guiding the tube, and means tending to yieldingly hold the tube in operative position.

3. In combination, a disk opener, a seed tube associated with said disk, a support for the tube, the tube capable of movement on its support and longitudinally of its axis, coöperating means on tube and support for guiding the tube.

4. In combination, a disk opener, a seed tube associated with said disk, a support for the tube, the tube capable of movement on its support and longitudinally of its axis, coöperating means on tube and support for guiding the tube, and means tending to yieldingly hold the tube in operative relation to the disk.

5. In combination, a pivotally supported arm, a disk opener carried by said arm, a seed tube support connected with said arm, a seed tube sustained by said arm having a shoe or runner extending forwardly and unattached at its forward end, said tube capable of vertical movement independent of the disk, and means on the tube in operative relation with the seed tube support for guiding the tube in its movement.

6. In combination, a pivotally supported arm, a disk opener carried by said arm, a seed tube support connected with said arm, a seed tube sustained by said arm having a shoe or runner extending forwardly and unattached at its forward end, said tube capable of vertical movement independent of the disk, means on the tube in operative relation with the seed tube support for guiding the tube in its movement, and means tending to yieldingly hold the tube and runner in operative relation to the disk.

7. In combination, a disk opener, a seed tube having a runner in proximity to the convex face of the disk and unattached at its forward end, said tube capable of vertical movement independent of the disk, and guiding means for the tube whereby, when the tube moves upward the operative relation of runner with the convex face of the disk may be maintained.

8. In combination, a disk opener, a tubular support having slots in its wall, a seed tube carried in the said support and capable of movement therethrough, and means on the tube operative in the slots of the support.

9. In combination, a disk opener, a tubular support having slots in its wall, a seed tube carried in the said support and capable of movement therethrough, means on the tube operative in the slots of the support, and a spring acting on the tube.

10. In combination, a disk opener, a seed tube support, a seed tube sustained by said support and capable of vertical movement on the support, and complemental means on the tube and support to guide said tube during its vertical movement.

11. In combination, a disk opener, a seed tube support, a seed tube sustained by said support and capable of vertical movement on the support, complemental means on the tube and support to guide said tube during its vertical movement, and a spring acting on the tube.

12. In combination, a concavo-convex disk, a seed tube associated therewith and having a shoe or runner extending forwardly adjacent the convex face of the disk, a support for the tube, said tube and runner capable of vertical movement on its support, and guiding means for sustaining the operative relation between the runner of the tube and convex face of the disk, when the tube moves up and down.

13. In combination, a concavo-convex disk, a seed tube associated therewith and having a shoe or runner extending forwardly adjacent the convex face of the disk, a tubular sustaining member containing the tube, said member having slotted walls, the tube capable of longitudinal movement in the said tubular member, and means on the tube, operating in the slots of the member, for guiding the tube during its longitudinal movement and thereby sustain the operative relation between the runner of the tube and convex face of the disk.

14. In combination, a concavo-convex disk, a seed tube associated therewith and having a shoe or runner extending forwardly adjacent the convex face of the disk, a support for the tube, said tube and runner capable of vertical movement on its support, guiding means for sustaining the operative relation between the runner of the tube and convex face of the disk, when the tube moves up and down, and means tending to yieldingly depress the tube.

15. In combination, a disk opener, a seed tube, a support, a sustaining member for the tube having a rotatable adjustable connection with said support, said tube capable of vertical movement in said sustaining member.

16. In combination, a draw bar, a disk journaled thereon, a tubular member having an adjustable connection with said draw bar, a seed tube carried through the said member and capable of movement longitudinally of said member, and a spring acting on said tube.

17. In combination, a concavo-convex disk, a seed tube associated with said disk and having a runner carried adjacent the convex face of said disk and unattached at its forward end, said tube and runner capable of vertical movement independent the disk, and means for laterally adjusting the runner relative to the face of the disk.

18. In combination, a concavo-convex disk, a seed tube support, said support provided with vertically disposed approximately arc-shaped slots, a seed tube carried by the support and having a runner adjacent the convex face of the disk and unattached at its forward end, said tube capable of vertical movement, and means on the tube operating in the slots, to guide the tube and runner during their vertical movement.

19. In combination, a concavo-convex disk, a seed tube support, said support provided with vertically disposed approximately arc-shaped slots, a seed tube carried by the support and having a runner adjacent the convex face of the disk and unattached at its forward end, said tube capable of vertical movement, and means on the tube operating in the slots, to guide the tube and runner during their vertical movement, and a spring constantly acting to depress the tube.

20. In combination, a draw-bar, a disk opener supported by the draw-bar, a seed tube support, an arm connected with the draw-bar and provided with slotted openings, bolts passing through the slots of the arm and adjustably connecting the seed tube support to said arm, and a seed tube carried by said support and movable longitudinally relatively thereto.

21. In combination, a draw-bar, a disk opener supported by the draw-bar, a tubular support, a member connected with the draw-bar and having a portion to partially encircle the tubular support and formed with slots, bolts adjustable in said slots and connecting the tubular support to the member, and a seed tube sustained by said support and movable axially relatively to said tubular support.

22. In combination, a draw-bar, a disk opener supported by the draw-bar, a tubular support, a member connected with the draw-bar and having a portion to partially encircle the tubular support and formed with slots, bolts adjustable in said slots and connecting the tubular support to the member, a seed tube sustained by said support and movable axially relatively to said tubular support, and means tending to yieldingly depress said seed tube.

23. In combination, a concavo-convex disk, a tubular seed tube support, said support provided with diametrically disposed and reversely arranged approximately arc-shaped slots, a seed tube carried by the support and having a runner adjacent the convex face of the disk and unattached at its forward end, said tube capable of vertical movement, and means on the tube operating in the slots, to guide the tube and runner during their vertical movement.

24. In combination, a disk opener, a seed tube support provided with slots forming portions of threads, a seed tube, and means on the tube operatively carried in said slots.

25. In combination, a disk opener, a tubular seed tube support provided with diametrically oppositely disposed slots which, together, form portions of threads, a seed tube carried through said support, and means on the tube movable in said slots.

In testimony whereof we affix our signatures, in presence of two witnesses.

CLARENCE A. PATTISON.
LUTHER E. ROBY.

Witnesses:
CHAS. W. LA PORTE,
E. M. BARNHARDT.

---

Copies of this patent may be obtained for five cents each, by addressing the " Commissioner of Patents, Washington, D. C."